(No Model.) 2 Sheets—Sheet 2.

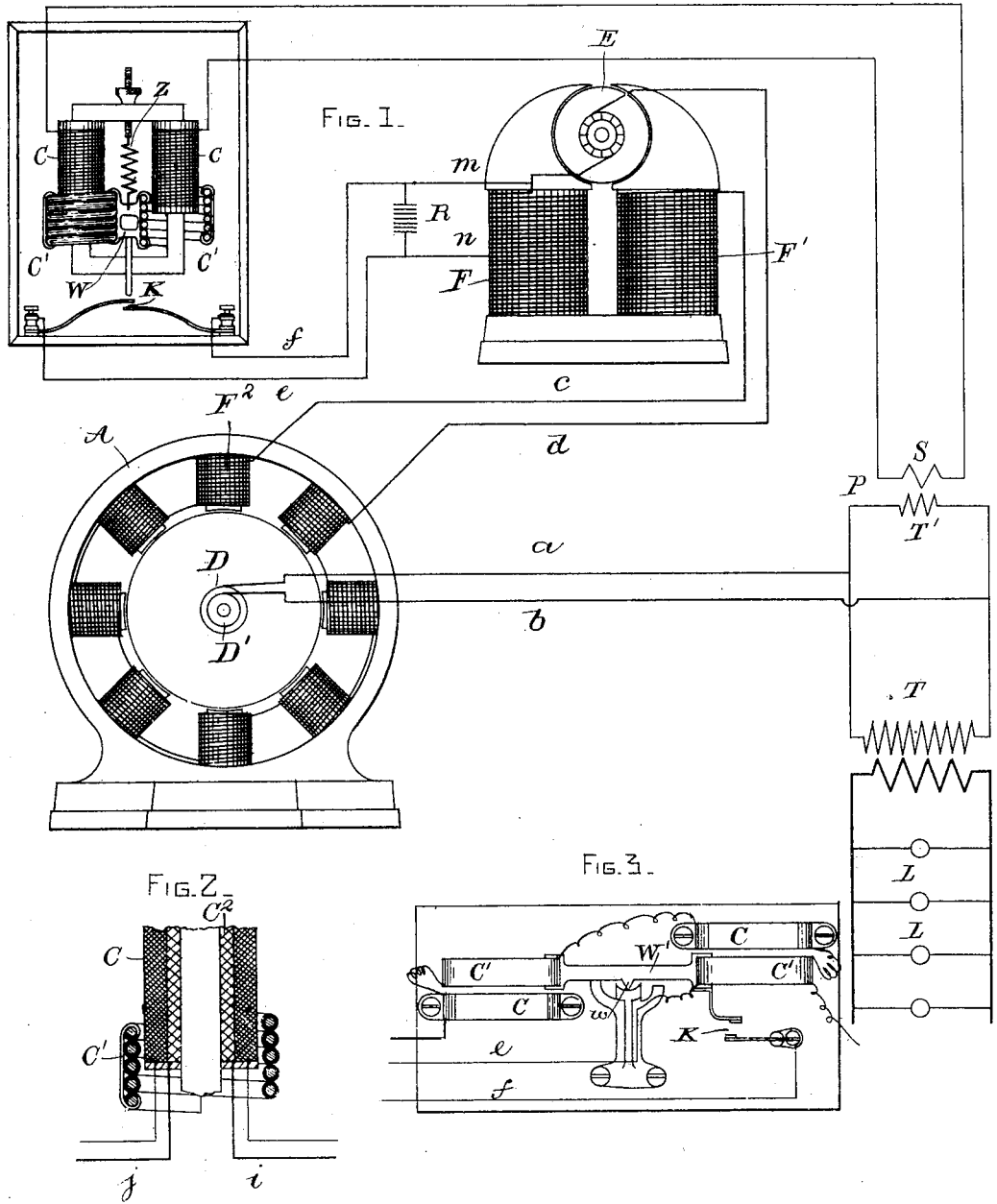

E. THOMSON.
REGULATOR FOR ELECTRIC GENERATORS.

No. 502,788. Patented Aug. 8, 1893.

Witnesses:
Alec F. Macdonald.
N. F. Hayes

Inventor:
Elihu Thomson
by Binkley & Blodgett
Attys.

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

REGULATOR FOR ELECTRIC GENERATORS.

SPECIFICATION forming part of Letters Patent No. 502,788, dated August 8, 1893.

Application filed May 23, 1892. Serial No. 434,076. (No model.)

*To all whom it may concern:*

Be it known that I, ELIHU THOMSON, a citizen of the United States, residing at Swampscott, county of Essex, State of Massachusetts, have invented a certain new and useful Improvement in Regulators for Electric Generators, of which the following is a specification.

My present invention relates to the regulation of dynamos for constant potential circuits and is particularly adapted to the control of the potential delivered to line from large alternating dynamos, though by proper modifications it is equally well adapted to the regulation of continuous current dynamos.

The object of the invention is to secure by simple means a regulating action which does not involve the flow of large currents, or a change in the flow of large currents directly by the regulating appliances. This is accomplished by rendering ineffective or rendering active, alternately, sections of the field winding of an exciter machine, which feeds the field magnets of the main machine.

Figure 4:
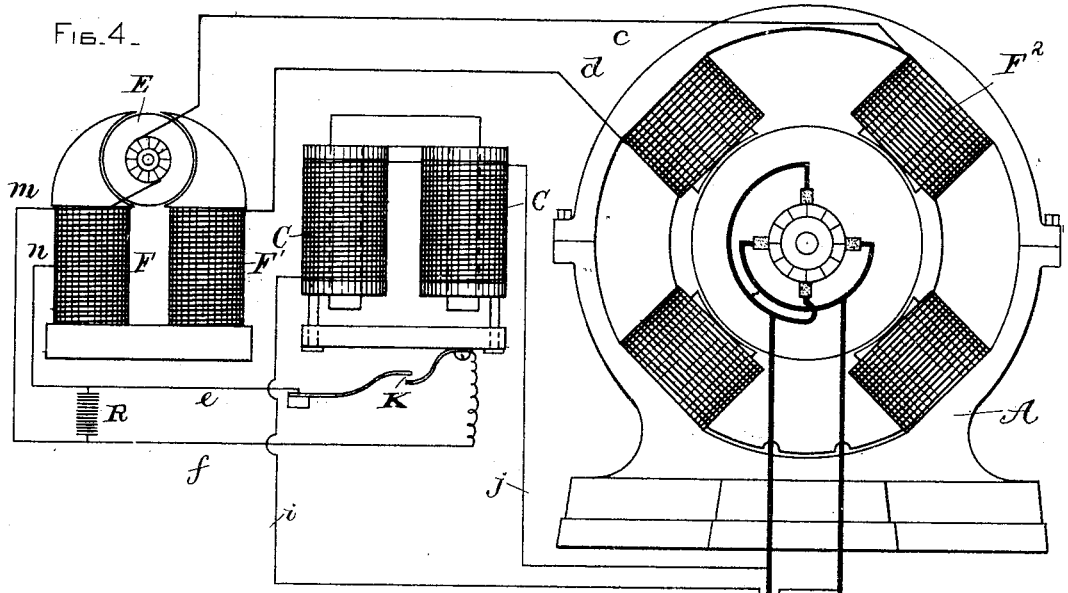
Figure 5:
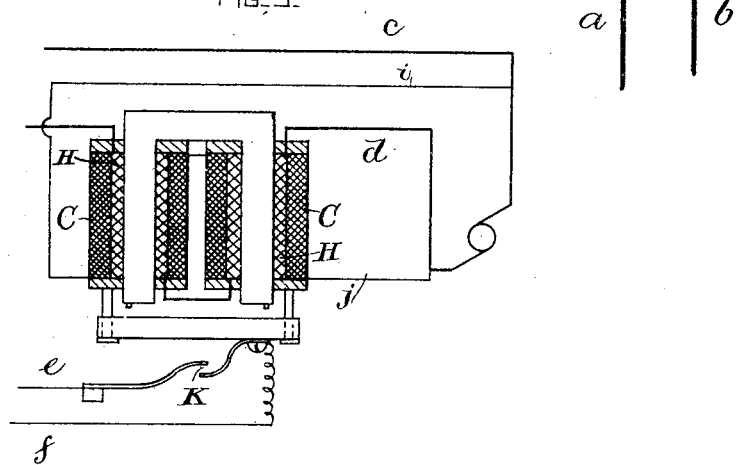

In the drawings Figure 1 is a diagrammatic view of an alternating current dynamo equipped with my invention. Fig. 2 is a section of a portion of a modified regulator. Fig. 3 shows another modified construction of the regulator. Fig. 4 shows the application of my invention to a continuous current dynamo, and Fig. 5 is a modification thereof.

Referring to Fig. 1, A represents a large alternating dynamo the armature of which delivers currents to line from the rings D, D', during the revolution, as usual. The main wires $a$, $b$, lead from the machines to transformers, as at T, working lines L L in the usual way. Such a machine may be a large directly connected machine, the armature or the field of which revolves and upon which it would be inconvenient to use arrangements for compounding the field to maintain constant potential. The field winding of the machine is composed of a single winding excited by a series exciter E, that is, the field and armature of this exciter are in series, F, F', being the two field coils. The exciter is represented diagrammatically only, as are also the transformers, &c.

Either directly bridging the main wires $a$ $b$, or immediately responsive to the potential between such wires by transformation, as at T', P S, is a responsive electro magnetic device, seen at the top of the figure. The apparatus T', P S, represents a transformer specially arranged to have a definite transforming relation, in the secondary S, of which is placed the controlling device. This controlling device consists of a number of coils C C, wound upon a laminated magnetic frame, shown in dotted lines, and tending to produce alternating polarities at the upper and lower parts of the frame respectively. The coils C, C, form a closed electric circuit responding to the potential of the secondary S, which in turn responds to the primary potential. Outside of and parallel to the coils C, C, are closed circuit coils C', C', in which, during the alternations of current in C, C, corresponding alternations of current are developed by induction, which currents in C', C', repel themselves vigorously from those in C, C, on account of the lag and repulsive action consequent thereon. The coils C' C' are movable up and down and are sustained, or otherwise supported, so as to be free to move. They are shown as borne on a spring Z, and a support W, bearing at its lower end a projection whereby a contact at K may be closed when the coils C' C' are repelled downward with sufficient force.

R, represents a resistance bridging the contact at K, and which is made low enough to get rid of the damaging spark at K, though without being so low as to prevent the proper action of the contacts in controlling the circuit to which they are carried. It is well to make the spring Z adjustable, so that the exact moment of closing the contacts at K may be set. The contacts at K form a shunt, when closed, around a section $m\,n$ of the field magnet coil of the exciter E, the wires $e\,f$ showing the connections.

Instead of using concentric coils as shown in Fig. 1, I may employ flat coils placed side by side, as shown in Fig. 3, the movable coils C' C' being supported on a beam W' which is balanced on a knife edge $w$, and carries one of the contacts K. In this case, the terminals P S are connected in series through all the coils, as shown, instead of through the coils C C only.

The action is as follows: If an increase of potential between $a\ b$ occurs, due to turning off of load, or increase of speed of the dynamo A, the excitation of the machine A will be too strong, and such increased potential causes the coils C C to act more vigorously to repel the coils C' C' and thus close the contact at K, which contact is a shunt of practically no resistance around a portion of the field of the exciter E. The field coils of the large machine $F^2$, &c., now lose current rapidly and the potential comes down. It continues to go down until the contact at K is opened, when the section $m\ n$ of the field of the exciter E is again thrown in and its power of excitation increased. During action a position of equilibrium, as to the times and intervals of closing of the contact K, is soon reached, such that a practically constant potential is retained between the terminals of the exciter, and, of course, by consequence between the terminals of the machine A. Any sudden shifting on or off of load, or change of speed, produces that action of contacts at K which is requisite to cure the irregularity, and the contacts at K, during normal action, are opening and closing at intervals. The actions of adjustment while not producing large or constant changes, are still quick enough, so far as the field of the large machine is concerned to speedily compensate for any irregularities. The field of the exciter E may be surrounded by a copper band, or closed circuit, which will slow its response to the opening and closing of the contacts K and at the same time tend to prevent sparking at those contacts.

It sometimes happens that instead of maintaining a constant potential at the terminals $a\ b$ of the dynamo, it may be necessary to raise the potential with an increased load. To do this a slight change in the controlling action is alone required, as indicated in Fig. 2. It is only necessary to add a differential coil in the main circuit from dynamo A or from one of its secondary circuits. Besides the coil C C, there is a coil of coarse wire $C^2$ responsive to the main circuit leaving the dynamo A, the terminals of which coil are marked, in Fig. 2, as $i$ and $j$. The number of turns may be varied to suit the amount of effect required and may be shunted more or less to vary their action. They simply tend to prevent, more and more as the load comes on, the closing of the contact at K, so that the potential of the machine rises and the degree of excitation also rises as the load is increased, giving the effect of over-compounding, simply through the agency of the controlling magnetic system, or electro magnetic device operating with a contact at K, Fig. 1.

If the machine instead of being an alternating current machine is a machine generating continuous currents, such as is shown in Fig. 4, then the controlling device becomes simply an electro magnet, C, C, the coils of which are in shunt to the mains $a, b$, by connections $i, j$, and the armature of which, on being attracted beyond a certain point, closes contact, as at K. Furthermore if it be desired to compound the controlling magnet in this case, it is provided with two windings, as in Fig. 5, a shunt winding $i, j$ across the main circuit mains $c, d$, and an opposing differential winding in series, the effect of the opposing or differential winding being made to decrease the effect of the shunt winding to just that extent to cause proper control, and under load to cause a higher potential and a higher degree of excitation at the terminals of the machine than when no load exists and to the exact percentage required for practical purposes. Such a controlling device is shown in Fig. 5, where C C is a shunt coil and H H a series coil acting on an armature to close the contact K, which shunts a portion of the exciter field.

What I claim as new, and desire to secure by Letters Patent, is—

1. The combination of a dynamo with a separate exciter therefor, and an electric circuit controlling the potential of the exciter, a switch adapted to close or break said circuit, and an electro-magnetic device responsive to changes in the potential of the main circuit and controlling said switch in the regulating circuit, as set forth.

2. The combination of a dynamo with a separate exciter therefor, means for regulating the potential of said exciter, and an electro-magnetic device controlling said regulating means, said device comprising an electromagnet arranged to respond to changes of potential in the main circuit, and a closed coil or circuit movable under the influence of said magnet.

3. The combination with a dynamo, of a separate exciter, and means, substantially as described, whereby a portion of the field winding of the exciter is rendered operative or inoperative by the change in potential of the main circuit.

4. The combination with a dynamo, of a separate exciter, having a portion of its field winding included in a shunt, said shunt being controlled by the varying potential of the main circuit, substantially as set forth.

5. The combination with a dynamo, of a separate exciter, having a portion of its field magnet included in a shunt, and an electro magnet arranged to open and close said shunt, said magnet being controlled by a change in potential of the main circuit, substantially as set forth.

6. The combination with a dynamo, of a separate series-wound exciter, having a portion of its field magnet included in a shunt, an electro magnet controlling said shunt, said magnet being in turn controlled by a change in potential of the main circuit, substantially as described.

7. The combination with a dynamo, of a separate exciter having a portion of its field winding included in a shunt, an electro magnet arranged to respond to changes in the potential of the main circuit, and an axially movable helix concentric with said magnet, and adapted to close and open said shunt, substantially as described.

8. The combination with a dynamo, of a separate exciter having a portion of its field winding included in a shunt of no resistance, an electro magnet responsive to variation in the potential of the main circuit, an axially movable helix concentric with said electro magnet, and controlling the said shunt, and means for adjusting the movement of the helix, substantially as set forth.

9. The combination with an exciter E, F, F', having the shunt $e, f$ provided with the contact K, of an electro magnet C, C, responsive to variations in the main circuit, and the axially movable helices C', C', supported by the adjustable spring Z, and arranged to close the contact K when the magnets C, C, are excited to a predetermined degree, substantially as set forth.

10. The combination of a coil, as C, a second coil as $C^2$, adapted to respond to variations of potential in the main circuit of a dynamo, and a third coil as C', repelled by the coils C and $C^2$, and arranged to close a shunting switch; whereby an increase of load acts to increase the potential of the delivered current.

In testimony whereof I have hereto set my hand this 20th day of May, 1892.

ELIHU THOMSON.

Witnesses:
JOHN W. GIBBONEY,
BENJAMIN B. HULL.